(12) United States Patent
Coker

(10) Patent No.: US 10,618,452 B1
(45) Date of Patent: Apr. 14, 2020

(54) CARGO STRAP PROTECTOR

(71) Applicant: Larry Coker, Houston, TX (US)

(72) Inventor: Larry Coker, Houston, TX (US)

( * ) Notice: Subject to any disclaimer, the term of this patent is extended or adjusted under 35 U.S.C. 154(b) by 0 days.

(21) Appl. No.: 16/280,619

(22) Filed: Feb. 20, 2019

(51) Int. Cl.
*B60P 7/08* (2006.01)
*B60P 7/135* (2006.01)
*B61D 45/00* (2006.01)
*B65D 19/38* (2006.01)
*B65D 88/16* (2006.01)

(52) U.S. Cl.
CPC ............. *B60P 7/0869* (2013.01); *B60P 7/135* (2013.01); *B61D 45/00* (2013.01); *B65D 19/38* (2013.01); *B65D 88/1693* (2013.01)

(58) Field of Classification Search
CPC ........ B60P 7/0869; B60P 7/135; B61D 45/00; B61D 19/38; B61D 88/1693; B65D 71/04; B65B 13/181; E05D 2003/025; E05D 2003/027; E05D 2003/02
See application file for complete search history.

(56) References Cited

U.S. PATENT DOCUMENTS

| | | | |
|---|---|---|---|
| 3,073,439 A | 1/1963 | Symmonds, Jr. | |
| 4,765,479 A * | 8/1988 | Roberts | B60P 7/0869 206/453 |
| 4,938,357 A | 7/1990 | Schmidt | |
| 5,056,664 A | 10/1991 | Demers | |
| 5,584,623 A * | 12/1996 | Nadherny | B60P 7/0869 410/155 |
| 5,848,865 A * | 12/1998 | Beals | B60P 7/0869 410/99 |
| 5,878,548 A * | 3/1999 | Sauer | B60P 7/0869 206/453 |
| 6,158,086 A * | 12/2000 | De Souza | E05D 7/04 16/237 |
| 6,820,906 B1 * | 11/2004 | McClendon | B60P 7/0853 294/104 |
| 7,311,483 B1 | 12/2007 | Nudo | |
| 7,407,353 B2 * | 8/2008 | George | B60P 7/0869 410/41 |
| 7,677,849 B2 * | 3/2010 | Scott | B60P 7/0869 410/155 |
| 8,915,685 B2 * | 12/2014 | Flores | B65B 13/181 410/99 |
| 9,321,392 B1 | 4/2016 | LeBrun | |

\* cited by examiner

*Primary Examiner* — Robert Sandy
*Assistant Examiner* — Rowland Do
(74) *Attorney, Agent, or Firm* — Patterson & Sheridan, L.L.P.

(57) ABSTRACT

A strap protector that includes a first member having a first castellated edge, a ramp sloping down and away from the first castellated edge, and a first securing member extending from one inner wall towards an opposite inner wall, forming a strap opening between the ramp and the first securing member configured to receive a strap. The strap protector also includes a second member having a second castellated edge, a ramp sloping down and away from the second castellated edge, and a second securing member extending from one inner wall towards an opposite inner wall, forming a strap opening between the ramp and the second securing member configured to receive the strap. The strap protector also includes a pin disposed through the first and second members to pivotally connect the first member to the second member.

20 Claims, 5 Drawing Sheets

CARGO STRAP PROTECTOR

BACKGROUND

Field

Embodiments of the disclosure include strap protectors for use with cargo straps.

Description of the Related Art

Strap protectors are used with cargo straps to protect cargo from being damaged by the cargo straps and to reduce the wear on the cargo straps during use. The strap protectors provide a protective layer between the edge of the cargo and the cargo strap that secures the cargo to a vehicle, such as a flatbed truck. Conventional strap protectors are prone to breakage and/or require the user to feed the cargo strap through slots formed in the strap protectors, which makes it difficult to install or relocate after the cargo strap is in place.

Therefore, there exists a need for new and/or improved strap protector designs.

SUMMARY

In one embodiment, a strap protector comprises a first member comprising a first castellated edge having at least one tab with a pin opening disposed through the tab; a ramp sloping down and away from the first castellated edge forming a pair of inner walls; and a first securing member extending from one of the inner walls towards the opposite inner wall, forming a strap opening between the ramp and the first securing member configured to receive a strap; a second member comprising a second castellated edge having at least one tab with a pin opening disposed through the tab; a ramp sloping down and away from the second castellated edge forming a pair of inner walls; and a second securing member extending from one of the inner walls towards the opposite inner wall, forming a strap opening between the ramp and the second securing member configured to receive the strap; and a pin disposed through the pin openings of the first member and the second member to pivotally connect the first member to the second member.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
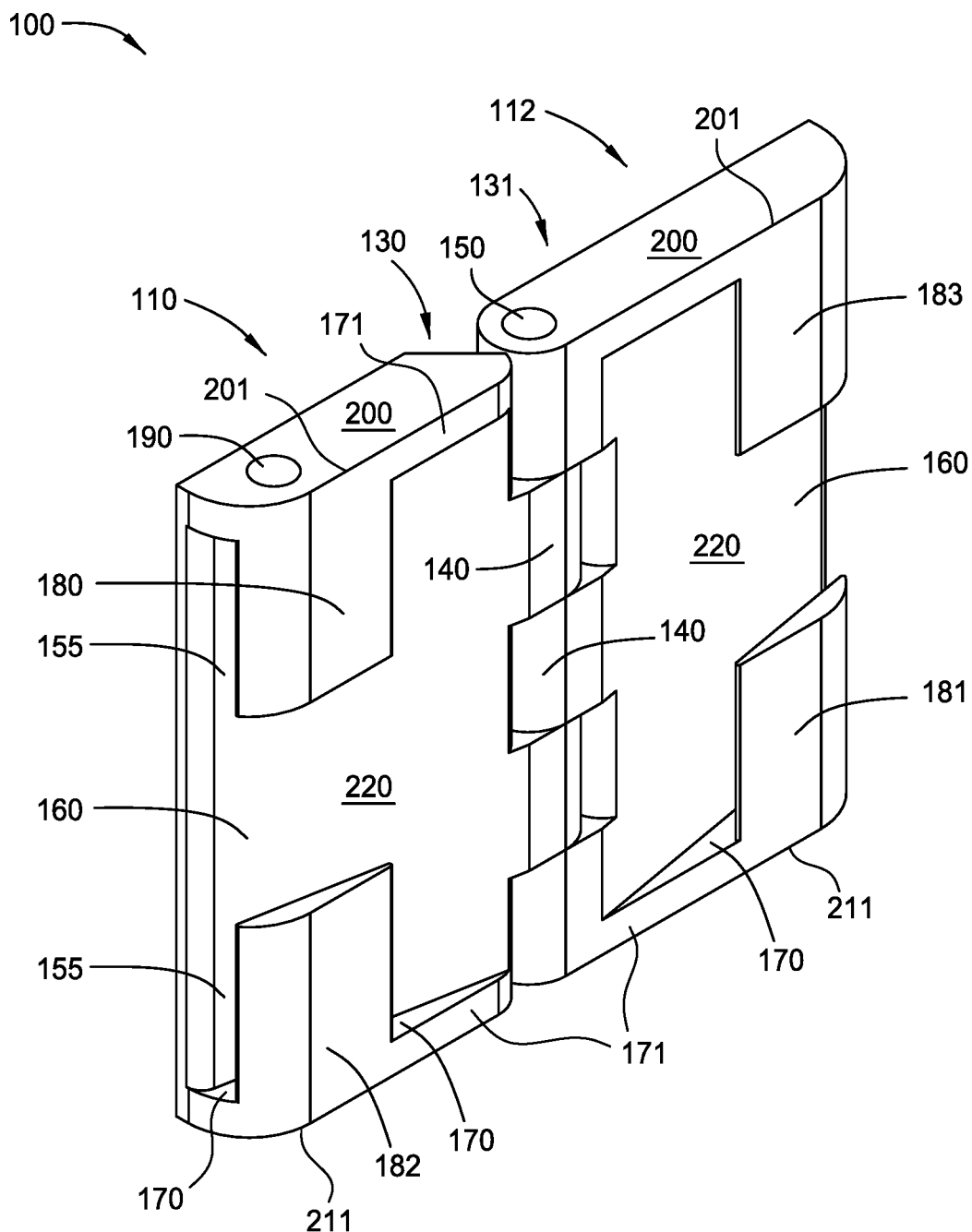
FIG. 1 is an isometric front view of a strap protector from the top left corner.
Figure 2:
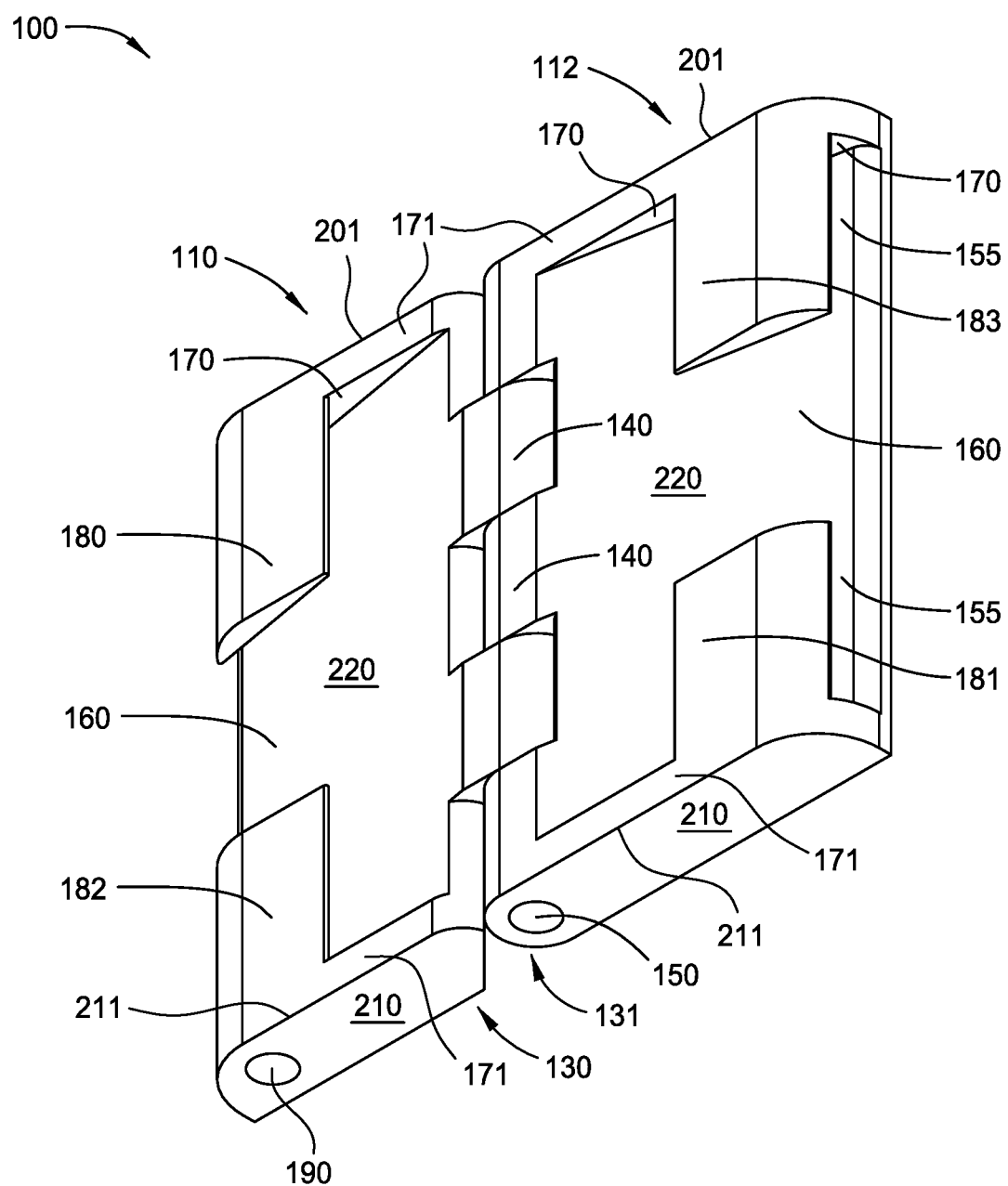
FIG. 2 is an isometric front view of the strap protector from the bottom right corner
Figure 3:
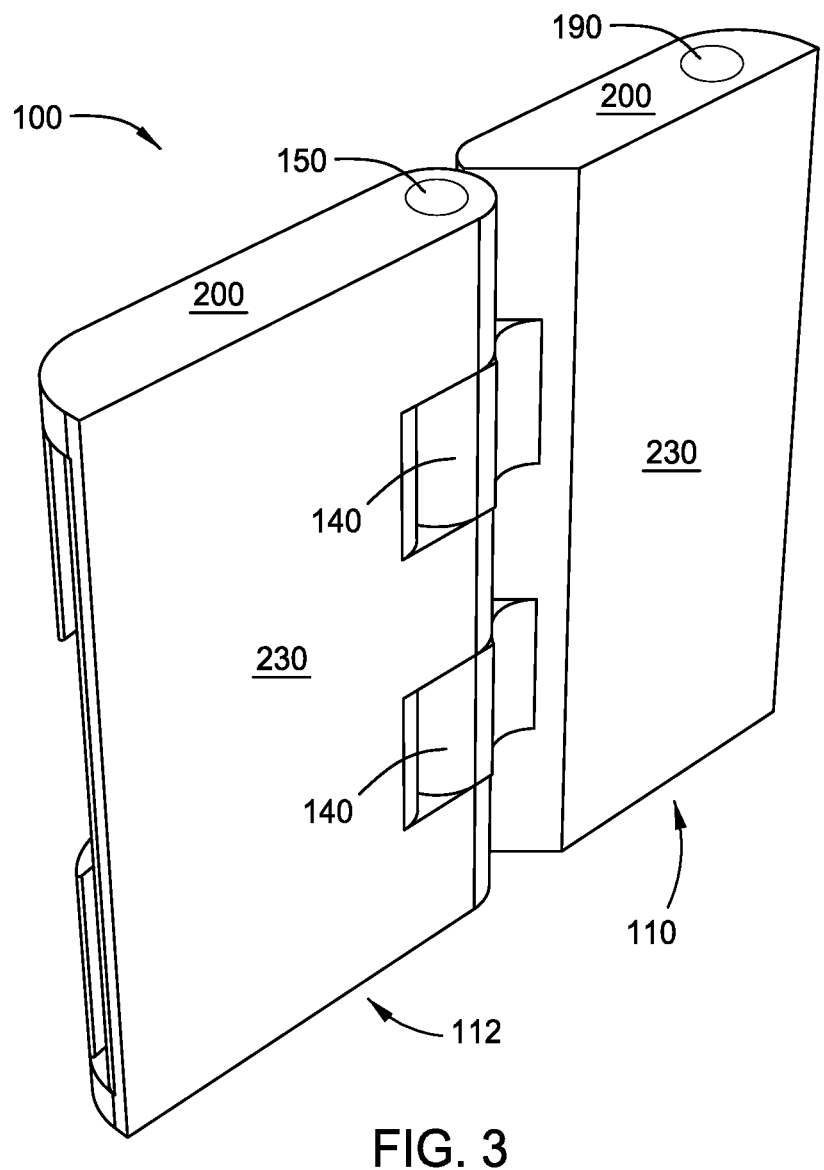
FIG. 3 is an isometric back view of the strap protector from the top right corner
Figure 4:
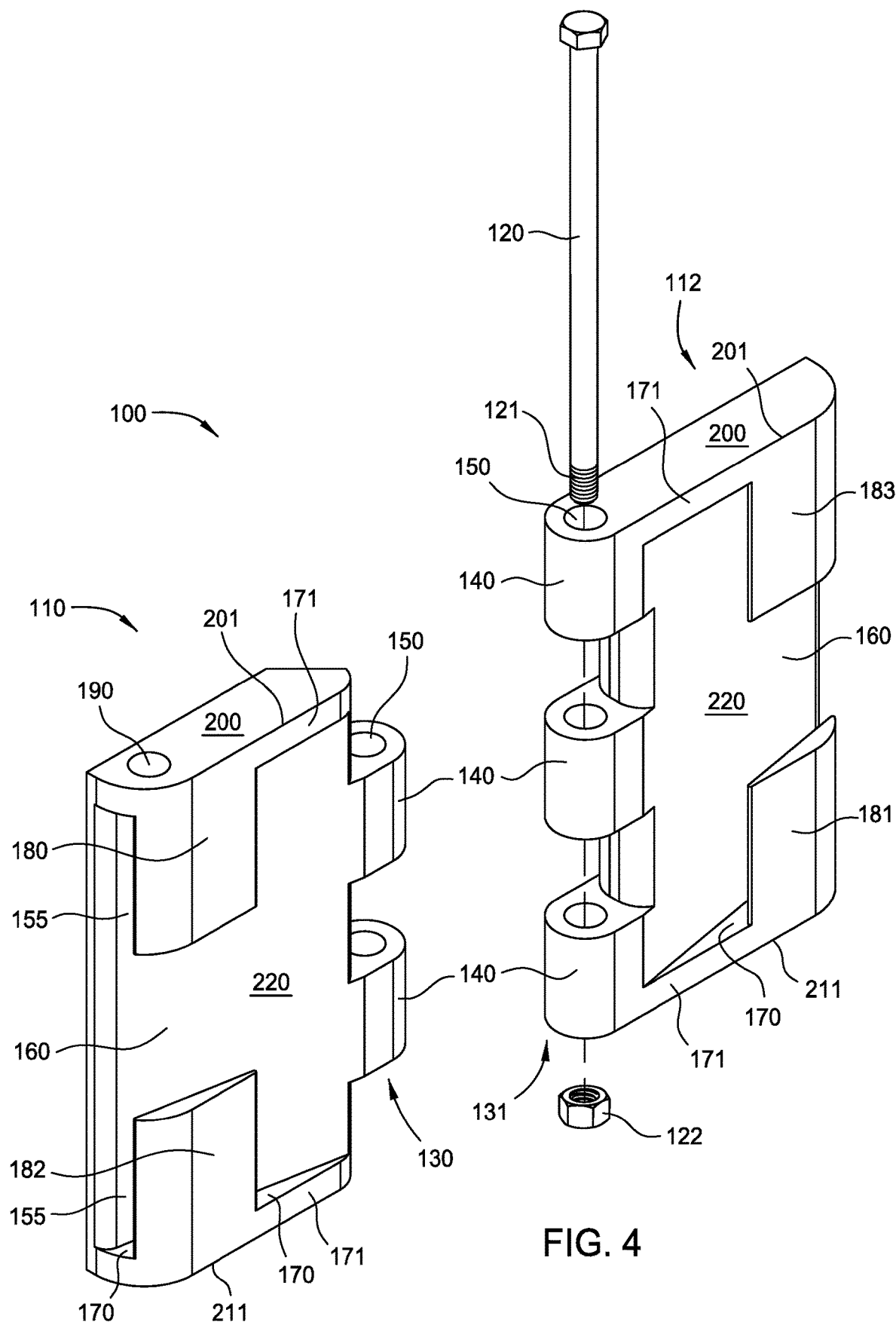
FIG. 4 is an exploded isometric front view of the strap protector from the top left corner.

FIGS. 1, 2, 3, and 4 illustrate a strap protector 100 according to one embodiment. Referring to FIGS. 1, 2, 3, and 4, the strap protector 100 includes a first member 110, a second member 112, and a pin 120 (as shown in FIG. 4) that pivotably connects the first member 110 to the second member 112. The first member 110 and second member 112 can be constructed from any number of materials, including but not limited to, polyethylene and/or metal. The strap protector 100 can be sized to accommodate different sizes of straps, and in particular straps with different widths.

The first member 110 has a first castellated edge 130, which includes two tabs 140 (more clearly shown in FIG. 4). Each tab 140 of the first castellated edge 130 has a pin opening 150 disposed through the tabs 140. The first castellated edge 130 may include only one tab 140, or two or more tabs 140. The second member 112 has a second castellated edge 131, which includes three tabs 140 (more clearly shown in FIG. 4). Each tab 140 of the second castellated edge 131 has a pin opening 150 disposed through the tabs 140. The second castellated edge 131 may include only one tab 140, two tabs 140, or three or more tabs 140. The tabs 140 of the first member 110 and the tabs 140 of the second member 112 are configured to align with each other such that the pin 120 shown in FIG. 4 can be inserted through the pin openings 150 of all the tabs 140 to pivotably connect the first member 110 to the second member 120.

The first member 110 has a front face 220 that is sloped down and away from the first castellated edge 130 forming a ramp 160. The ramp 160 forms a set of rails 171 at the top edge 201 of the first member 110 and the bottom edge 211 of the first member 110. The rails 171 include inner walls 170 that are adjacent and perpendicular to the ramp 160. The first member 110 also has a top face 200, which includes a clamping hole 190. Another clamping hole 190 is positioned on a bottom face 210 of the first member 110 as shown in FIG. 2.

The first member 110 further includes a first securing member 180 that extends from the inner wall 170 located at the top edge 201, towards the opposite inner wall 170 located at the bottom edge 211. The first securing member 180 and the ramp 160 form a strap opening 155 (e.g. a gap) between the ramp 160 and the first securing member 180 configured to receive a strap. The first member 110 further includes a third securing member 182 that extends from the inner wall 170 located at the bottom edge 211, towards the opposite inner wall 170 and the first securing member 180 located at the top edge 201. The third securing member 182 and the ramp 160 form a strap opening 155 (e.g. a gap) between the ramp 160 and the third securing member 182 configured to receive a strap. The first securing member 180 and the third securing member 182 are spaced apart to allow a strap (such as strap 401 shown in FIG. 5) to be inserted into the strap openings 155 of the first member 110. In one embodiment, the first securing member 180 and the third securing member 182 can connect with each other such that the strap opening 155 is in the form of a single slot extending from the inner wall 170 located at the top edge 201 to the opposite inner wall 170 located at the bottom edge 211.

The second member 112 also has a front face 220 that is sloped down and away from the second castellated edge 131 forming a ramp 160. The ramp 160 forms a set of rails 171 at the top edge 201 of the second member 112 and the bottom edge 211 of the second member 112. The rails 171 include inner walls 170 that are adjacent and perpendicular to the ramp 160.

The second member 112 further includes a second securing member 181 that extends from the inner wall 170 located at the bottom edge 211, towards the opposite inner wall 170 located at the top edge 201. The second securing member 181 and the ramp 160 form a strap opening 155 (e.g. a gap) between the ramp 160 and the second securing member 181 configured to receive a strap. The second member 112 further includes a fourth securing member 183 that extends from the inner wall 170 located at the top edge 201, towards the opposite inner wall 170 and the second securing member 181 located at the bottom edge 211. The fourth securing member 183 and the ramp 160 form a strap opening 155 (e.g. a gap) between the ramp 160 and the fourth securing member 183 configured to receive a strap. The second securing member 181 and the fourth securing member 183 are spaced apart to allow a strap (such as strap 401 shown in FIG. 5) to be inserted into the strap openings 155 of the second member 112. In one embodiment, the second securing member 181 and the fourth securing member 183 can connect with each other such that the strap opening 155 is in the form of a single slot extending from the inner wall 170 located at the bottom edge 211 to the opposite inner wall 170 at the top edge 201.

Although the strap protector 100 is shown has having the first securing member 180, the second securing member 181, the third securing member 182, and the fourth securing member 183, embodiments of the strap protector 100 may include more or less securing members. In one embodiment, only the first securing member 180 and the third securing member 182 will be present on the strap protector 100. In one embodiment, only the second securing 181 member and the fourth securing member 183 will be present on the strap protector 100. In one embodiment, only the first securing member 180 and the second securing member 181 will be present on the strap protector 100. In one embodiment, the first securing member 180 will be present on the first member 110, and the second member 112 will contain the second securing member 181 and the fourth securing member 183. In one embodiment, the second securing member 181 will be present on the second member 112, and the first member 110 will contain the first securing member 180 and the third securing member 183.

FIG. 2 illustrates the strap protector 100 from the bottom face 210. The bottom face 210 includes the pin opening 150 from the tab 140 located on the second member 112. The first member 110 includes the clamping hole 190 located on the bottom face 210. The clamping holes 190 located on the top face 200 and bottom face 210 are configured to be used with a tool designed to help position (e.g. install, relocate, and/or adjust the location of) the strap protector 100 relative to a strap. The tool may be an extendable pole having a fork like end with two prongs that are able to spread apart or come together with the push of a trigger. The ends of the prongs may contain a hook that can fit into the clamping holes 190 to grip the first member 110 of the strap protector 100. The strap protector 100 can be moved along (e.g. up or down) a strap to a desired location or be removed from the strap without having to untie or remove the strap.

FIG. 3 illustrates the back side 230 of the strap protector 100. The back side 230 of the strap protector 100 is substantially flat. At least a portion of the back side 230 (such as the back side 230 of the first member 110 and/or the backside 230 of the second member 112) is configured to contact a surface of any cargo that is being secured with a strap and the strap protector 100.

FIG. 4 illustrates an exploded view of the strap protector 100. The first castellated edge 130 of the first member 110 is spaced apart from the second castellated edge 131 of the second member 112. The pin 120 can be a bolt, such as a non-graded bolt, having a nylon locking nut 122 that is threaded onto a threaded end 121 of the pin 120. The pin 120 pivotally connects the first member 110 and the second member 112 together by inserting the pin 120 through the pin openings 150 of the tabs 140 of the first member 110 and the second member 112 when in alignment with each other. The first member 110 and the second member 112 are rotatable relative to each other to a position where the first member 110 and the second member 112 form an angle greater than or less than a right angle (e.g. a 90 degree angle). The rotation allowed by the pin 120 enables the strap protector 100 to adjust to movement of a strap when in use, and in particular to move in the direction of a force applied by or to the strap as further described and shown with respect to FIG. 5.

Figure 5:
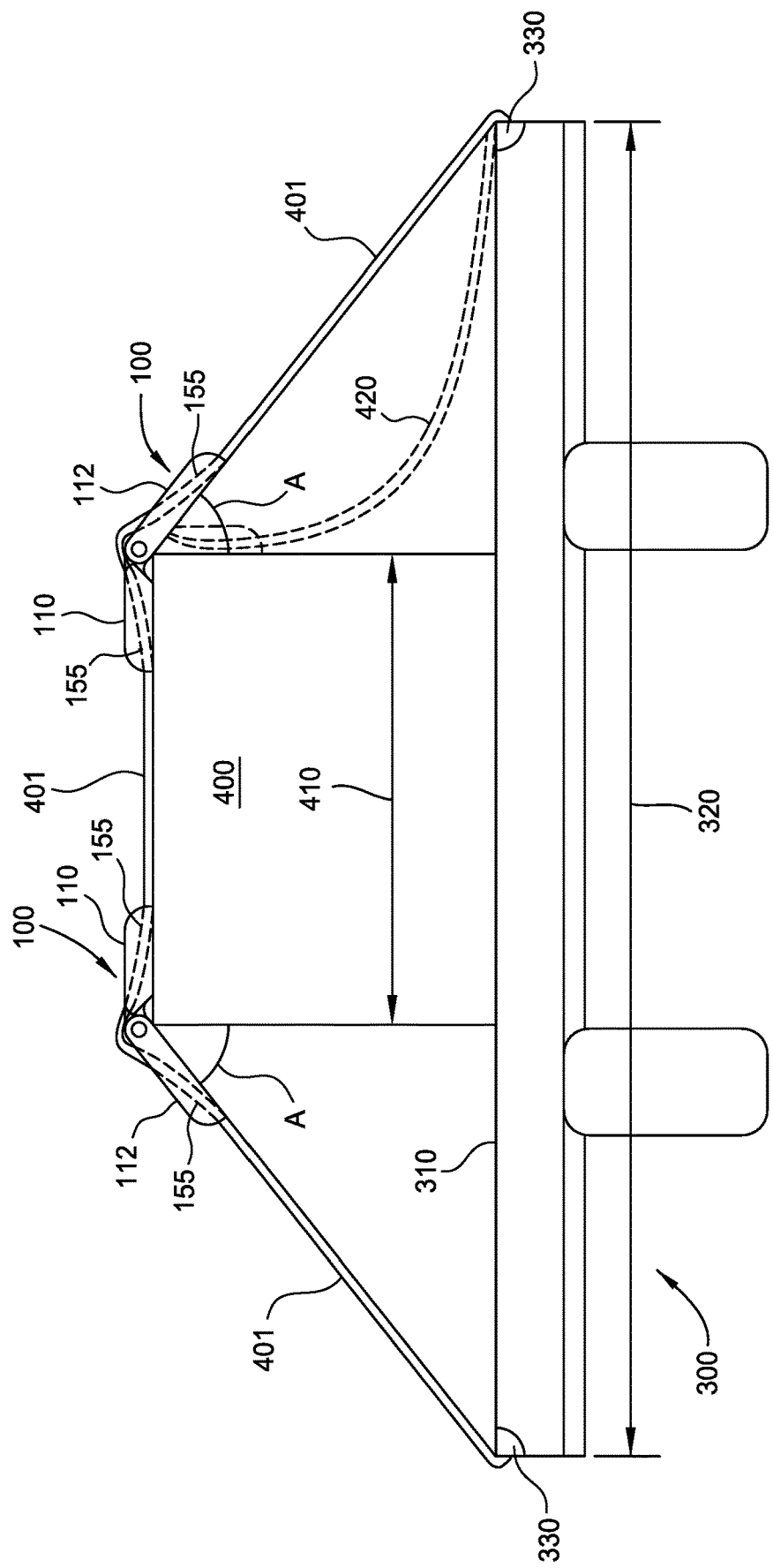
FIG. 5 is an image of the strap protector when in use.

FIG. 5 illustrates the strap protector 100 being used on a truck 300 having a flatbed 310. A piece of cargo 400 is located on the flatbed 310 and has a substantially rectangular shape defined by a width 410 that is less than a width 320 of the flatbed 310. Strap protectors 100 are placed along the top right and left edges of the cargo 400. A strap 401 is inserted into the strap openings 155 of each strap protector 100. The strap 401 is also hooked to tightening wench 330 located on the sides of the flatbed 310 before or after the strap 401 is inserted into the strap openings 155. Although the strap protectors 100 are shown with the second members 112 being positioned closer to the tightening wench 330, any one of or both of the strap protectors 100 can be reoriented such that the first members 110 are positioned closer to the tightening wench 330.

Initially, the strap 401 will have some slack as shown by dashed reference lines 420 and the strap protector 100 is positioned on the strap 401 along the top right edge of the cargo 400 such that the strap protector 100 can pivot at the corner of the cargo 400. As the strap 401 is tightened by the tightening wench 330, the strap 401 becomes taut and forms an angle A relative to the cargo 400. The strap protector 100 is configured to pivot and adjust to any angle "A" that the strap 401 forms relative to the cargo 400. Regardless of the size of the cargo 400 (e.g. angle, height, and/or width), the size of the flatbed 310 (e.g. angle, height, and/or width), and/or the location of the tightening wench 330, the strap protector 100 is configured to adjust to any angle A to provide the appropriate protection of the cargo 400 and the strap 401.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

The invention claimed is:
1. A strap protector, comprising:
a first member comprising:
a first castellated edge having at least one tab with a pin opening disposed through the tab;

a ramp sloping down and away from the first castellated edge, wherein a thickness of the first member varies in a direction away from the first castellated edge to form the ramp and a pair of inner walls; and a first securing member extending from one of the inner walls towards the opposite inner wall, forming a strap opening between the ramp and the first securing member configured to receive a strap;

a second member comprising:

a second castellated edge having at least one tab with a pin opening disposed through the tab;

a ramp sloping down and away from the second castellated edge, wherein a thickness of the second member varies in a direction away from the second castellated edge to form the ramp and a pair of inner walls; and a second securing member extending from one of the inner walls towards the opposite inner wall, forming a strap opening between the ramp and the second securing member configured to receive the strap; and a pin disposed through the pin openings of the first member and the second member to pivotally connect the first member to the second member.

2. The strap protector of claim 1, further comprising a third securing member extending from the inner wall of the first member opposite from the first securing member, forming a strap opening between the ramp of the first member and the third securing member configured to receive the strap.

3. The strap protector of claim 2, wherein the first securing member and the third securing member are spaced apart to allow the strap to be inserted into the strap opening formed between the ramp and the first securing member, and the strap opening formed between the ramp and the third securing member.

4. The strap protector of claim 1, further comprising a fourth securing member extending from the inner wall of the second member opposite from the second securing member, forming a strap opening between the ramp of the second member and the fourth securing member configured to receive the strap.

5. The strap protector of claim 4, wherein the fourth securing member and the second securing member are spaced apart to allow the strap to be inserted into the strap opening formed between the ramp and the second securing member, and the strap opening formed between the ramp and the fourth securing member.

6. The strap protector of claim 1, wherein the first member and the second member are constructed from polyethylene.

7. The strap protector of claim 1, wherein the first member and second member are constructed from a metal.

8. The strap protector of claim 1, wherein the pin is a non-graded bolt, and wherein a nylon locking nut is threaded onto a threaded end of the pin.

9. The strap protector of claim 1, further comprising clamping holes located on a top face and a bottom face of the first member configured to position the strap protector.

10. The strap protector of claim 1, wherein the at least one tab of the first member comprises two tabs each having the pin opening disposed therethrough, and the at least one tab of the second member comprises three tabs each having the pin opening disposed therethrough, the tabs of the second member being configured to align with the tabs of the first member such that the pin is disposed through the pin openings of the tabs of the first member and the tabs of the second member to pivotally connect the first member to the second member.

11. The strap protector of claim 1, wherein the thickness of the first member decreases in a portion of the first member disposed between the pair of inner walls of the first member in the direction away from the first castellated edge, and the thickness of the second member decreases in a portion of the second member disposed between the pair of inner walls of the second member in the direction away from the second castellated edge.

12. A strap protector, comprising:

a first member comprising:

a top surface;

a first castellated edge having at least one tab with a pin opening disposed through the tab;

a ramp sloping down and away from the first castellated edge at an angle relative to the top surface of the first member to form a pair of inner walls; and a first securing member extending from one of the inner walls towards the opposite inner wall, forming a strap opening between the ramp and the first securing member configured to receive a strap;

a second member comprising:

a top surface;

a second castellated edge having at least one tab with a pin opening disposed through the tab;

a ramp sloping down and away from the second castellated edge at an angle relative to the top surface of the second member to form a pair of inner walls; and a second securing member extending from one of the inner walls towards the opposite inner wall, forming a strap opening between the ramp and the second securing member configured to receive the strap; and a pin disposed through the pin openings of the first member and the second member to pivotally connect the first member to the second member.

13. The strap protector of claim 12, further comprising a third securing member extending from the inner wall of the first member opposite from the first securing member, forming a strap opening between the ramp of the first member and the third securing member configured to receive the strap, wherein the first securing member and the third securing member are spaced apart to allow the strap to be inserted into the strap opening formed between the ramp and the first securing member, and the strap opening formed between the ramp and the third securing member.

14. The strap protector of claim 12, further comprising a fourth securing member extending from the inner wall of the second member opposite from the second securing member, forming a strap opening between the ramp of the second member and the fourth securing member configured to receive the strap.

15. The strap protector of claim 14, wherein the fourth securing member and the second securing member are spaced apart to allow the strap to be inserted into the strap opening formed between the ramp and the second securing member, and the strap opening formed between the ramp and the fourth securing member.

16. The strap protector of claim 12, wherein a thickness of the first member decreases along the angle in a portion of the first member disposed between the pair of inner walls of the first member in a direction away from the first castellated edge, and wherein a thickness of the second member decreases along the angle in a portion of the second member disposed between the pair of inner walls of the second member in a direction away from the second castellated edge.

17. The strap protector of claim 12, wherein the first member and second member are constructed from polyethylene or metal.

18. The strap protector of claim 12, wherein the pin is a non-graded bolt, and wherein a nylon locking nut is threaded onto a threaded end of the pin.

19. The strap protector of claim 12, further comprising clamping holes located on a top face and a bottom face of the first member configured to position the strap protector.

20. The strap protector of claim 12, wherein the at least one tab of the first member comprises two tabs each having the pin opening disposed therethrough, and the at least one tab of the second member comprises three tabs each having the pin opening disposed therethrough, the tabs of the second member being configured to align with the tabs of the first member such that the pin is disposed through the pin openings of the tabs of the first member and the tabs of the second member to pivotally connect the first member to the second member.

\* \* \* \* \*